United States Patent
Ismail et al.

(10) Patent No.: US 12,481,078 B1
(45) Date of Patent: Nov. 25, 2025

(54) DRONE SWARM-BASED SEISMIC SURVEYING FOR OIL EXPLORATION AND LANDMINE DETECTION

(71) Applicant: King Fahd University of Petroleum and Minerals, Dhahran (SA)

(72) Inventors: Mohamed Alsayed Ahmed Mohamed Ismail, Dhahran (SA); Ayman Muhammed Abdallah, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/219,145

(22) Filed: May 27, 2025

Related U.S. Application Data

(60) Provisional application No. 63/724,226, filed on Nov. 22, 2024.

(51) Int. Cl.
 *G01V 1/22* (2006.01)
 *G01H 9/00* (2006.01)

(52) U.S. Cl.
 CPC ............ *G01V 1/226* (2013.01); *G01H 9/00* (2013.01); *G01V 2210/1295* (2013.01); *G01V 2210/1421* (2013.01)

(58) Field of Classification Search
 CPC ........... G01V 1/226; G01V 2210/1295; G01V 2210/1421; G01H 9/00
 USPC ........................................................ 367/64
 See application file for complete search history.

(56) References Cited

U.S. PATENT DOCUMENTS

| | | | |
|---|---|---|---|
| 5,109,362 | A | 4/1992 | Berni |
| 5,317,383 | A | 5/1994 | Berni |
| 5,936,233 | A | 8/1999 | Nunnally |
| 6,081,481 | A | 6/2000 | Sabatier et al. |

FOREIGN PATENT DOCUMENTS

CN    106370602 A1    2/2017

OTHER PUBLICATIONS

Alastair D. McAulay, "Airborne laser vibrometer for seismic subsurface inspection", Proceedings SPIE, vol. 8037, Laser Radar Technology and Applications XVI, Apr. 2011, pp. 80370Y-1 to 80370Y-6.

*Primary Examiner* — Daniel L Murphy
(74) *Attorney, Agent, or Firm* — Oblon, McClelland, Maier & Neustadt, L.L.P.

(57) ABSTRACT

A system for detecting an underground object based on seismic surveying includes a seismic wave generator configured to transmit seismic shock waves from an Earth surface into a subsurface region, and a laser Doppler vibrometer (LDV) configured to emit a plurality of LDV beams toward a plurality of drones. Each drone carries an optical beam steering unit operable to redirect the LDV beams toward the Earth surface. The LDV is further configured to detect LDV beams reflected from the Earth surface, the reflected beams modulated by surface vibrations induced by the seismic shock waves, and to generate a seismic dataset. A processing unit is configured to process the seismic dataset to identify underground objects based on seismic reflections. The system enables non-contact, high-resolution, and wide-area seismic surveying for detection of natural and artificial subsurface features including landmines, trenches, and hydrocarbon reservoirs.

20 Claims, 11 Drawing Sheets

DRONE SWARM-BASED SEISMIC SURVEYING FOR OIL EXPLORATION AND LANDMINE DETECTION

CROSS-REFERENCE TO RELATED APPLICATIONS

The present application claims priority to Provisional Application No. 63/724,226, filed on Nov. 22, 2024, the contents of which are incorporated herein by reference in their entirety.

STATEMENT OF ACKNOWLEDGEMENT

Support provided by King Fahd University of Petroleum and Minerals (KFUPM) is gratefully acknowledged.

BACKGROUND

Technical Field

The present disclosure is directed to a seismic surveying system utilizing drone swarms equipped with optical beam steering units configured to reflect laser Doppler vibrometer (LDV) beams for applications including oil exploration and landmine detection.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A seismic survey is a geophysical method used to image subsurface structures by generating seismic waves and recording their reflections using seismic sensors. Conventional seismic surveying methods involve generating seismic waves through mechanical sources, such as vibroseis trucks or explosives, and recording these waves using extensive arrays of geophones manually installed over large survey areas. The manual installation and management of tens of thousands of geophones pose significant logistical and economic challenges, including high setup costs, lengthy installation times, limited sensor density, and restricted spatial coverage. Several attempts have been made to address these challenges through non-contact measurement technologies. Laser Doppler vibrometer (LDV) systems have been employed for remote measurement of vibrations without physical contact with the measurement surface. However, traditional LDV setups have significant limitations, including limited operational range, sensitivity to vibration noise from carrying platforms, and complexity in accurately targeting measurement areas.

U.S. Pat. No. 6,081,481A discloses a method employing a laser Doppler vibrometer for detecting buried objects using seismic vibrations induced by remote sound sources. Although it effectively measures seismic discontinuities, it relies on stationary platforms or aircraft, thus limiting its mobility and operational flexibility. CN106370602A presents an ultrasonic inspection system utilizing drones equipped with laser direction adjustment means; however, its application is restricted to structural inspection and does not incorporate seismic wave generation and measurement techniques. Further, U.S. Pat. No. 5,936,233A describes an airborne system for buried object detection through acoustic and electromagnetic sensing, involving the use of projectiles for acoustic wave generation. The airborn system, while effective for specific detection tasks, lacks the flexibility of precise, large-area seismic scanning and the non-contact operational advantages offered by drone-based systems.

Despite the advancements in remote sensing technologies, existing approaches still present various challenges. First, the manual installation of such a high volume of geophones results in excessive setup time and operational costs. Second, the configuration and maintenance of a wireless network interconnecting thousands of geophones introduces significant technical complexity, often leading to signal degradation, data loss, and communication instability. Third, the spatial resolution and fidelity of seismic measurements are constrained by the physical density of geophone deployment, thereby limiting the achievable imaging accuracy. Lastly, the overall coverage area of the seismic survey is inherently restricted by the number of geophones available and the limitations of the associated wireless communication infrastructure. These limitations collectively underscore the need for an alternative, more efficient seismic survey methodology.

Therefore, there remains a need for a seismic surveying system that overcomes these limitations, providing efficient, economical, and high-resolution subsurface characterization capabilities. The present disclosure addresses these challenges through a novel seismic surveying system employing drone swarms equipped with lightweight optical beam steering units for precise reflection of LDV beams. This configuration facilitates rapid and cost-effective deployment, high spatial resolution, extensive coverage, and reduced operational complexity.

SUMMARY

In an exemplary embodiment, a method for detecting an underground object based on seismic survey is disclosed. The method includes, by a seismic wave generator placed at a first position on an Earth surface, generating seismic shock waves and transmitting the seismic shock waves from the Earth surface into an Earth subsurface, by a laser Doppler vibrometer (LDV) placed at a second position on the Earth surface, emitting a plurality of LDV beams towards a plurality of drones hovering in vicinity of the LDV, where each drone carries an optical beam steering unit, by each optical beam steering unit, changing a direction of a corresponding LDV beam emitted from the LDV to a direction toward the Earth surface, by the LDV, detecting LDV beams reflected from the Earth surface to generate a seismic dataset, the seismic dataset representing seismic signals from seismic events caused in the Earth subsurface by the seismic shock waves, and by a processing unit, processing the seismic dataset to identify an underground object in the Earth subsurface.

In another exemplary embodiment, a system for detecting an underground object based on seismic survey is disclosed. The system includes a seismic wave generator placed at a first position on an Earth surface, a laser Doppler vibrometer (LDV) placed at a second position on the Earth surface, a plurality of drones hovering in vicinity of the LDV, each drone carrying an optical beam steering unit, and a processing unit. The seismic wave generator generates seismic shock waves and transmits the seismic shock waves from the Earth surface into an Earth subsurface, the LDV emits a plurality of LDV beams towards the plurality of drones, each optical beam steering unit changes a direction of a corresponding LDV beam emitted from the LDV to a direction toward the Earth surface, the LDV detects LDV beams reflected from the Earth surface to generate a seismic dataset, the seismic dataset representing seismic signals from seismic events caused in the Earth subsurface by the seismic shock waves, and the processing unit processes the seismic dataset to identify an underground object in the Earth subsurface.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
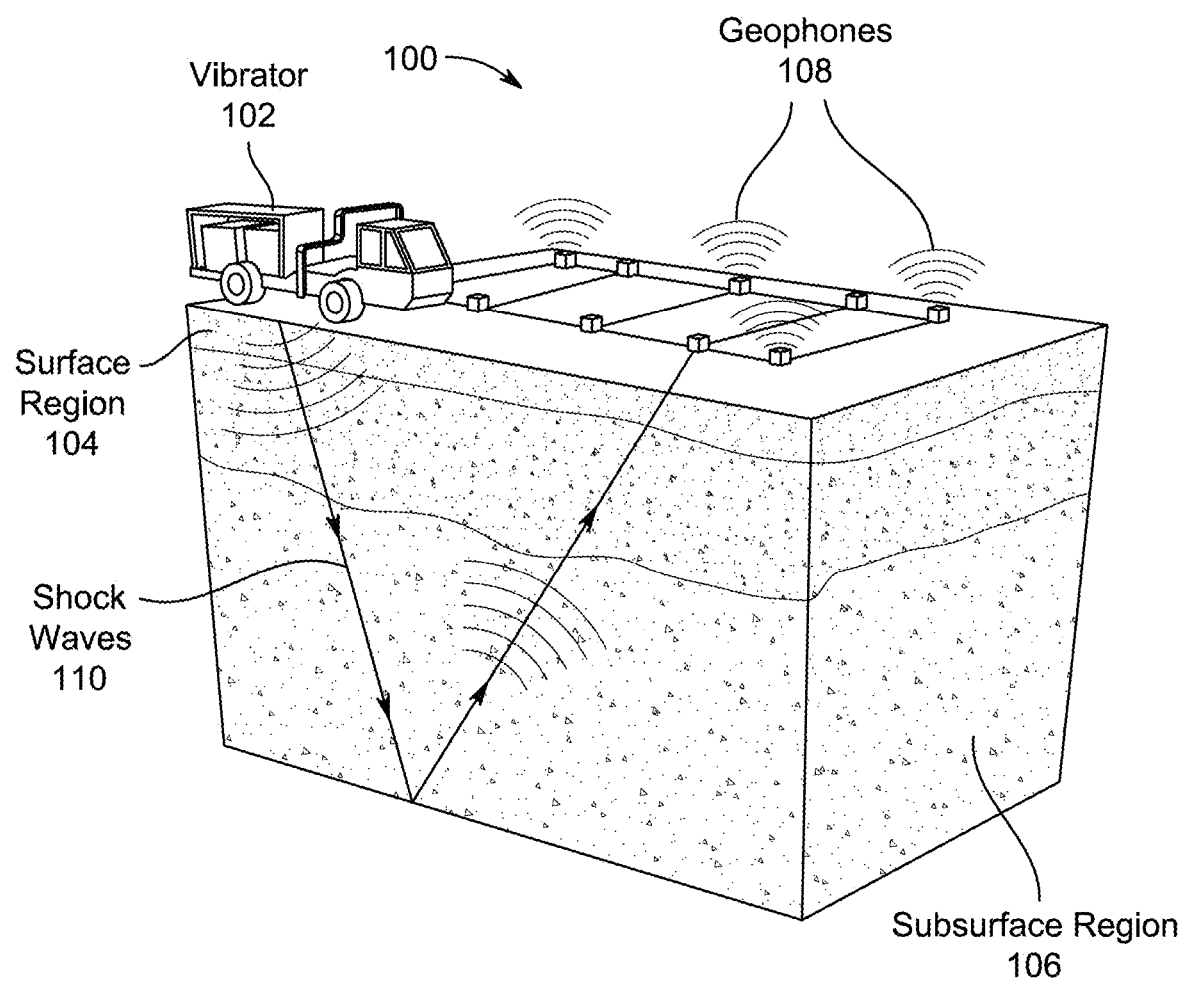
FIG. 1 illustrates a schematic diagram of a conventional seismic survey system.

In the drawings, like reference numerals designate identical or corresponding parts throughout the several views. Further, as used herein, the words "a", "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to drone swarm-based seismic surveying for oil exploration and landmine detection. The present disclosure addresses the limitations of conventional seismic surveying systems involving the manual installation of thousands of ground-mounted geophones. By implementing a drone swarm equipped with optical beam steering units in conjunction with a ground-based laser Doppler vibrometer (LDV), the invention eliminates the need for physical geophone arrays, reduces deployment complexity, and enhances spatial resolution. The LDV beams are redirected by drone-mounted flying mirrors toward the Earth surface to detect surface vibrations caused by seismic shock waves, enabling non-contact, high-resolution, and wide-area seismic sensing. The reflected LDV signals are processed to generate seismic datasets for identifying subsurface geological structures or artificial objects. The present disclosure renders scalable, cost-efficient, and accurate seismic surveying for applications including geological exploration, landmine detection, and subsurface infrastructure assessment.

FIG. 1 illustrates a conventional seismic survey system 100. The seismic survey system 100 is configured to detect and characterize geological formations and underground objects within a subsurface region 106. The seismic survey system 100 comprises a plurality of components strategically arranged on or beneath a surface region 104 to conduct seismic exploration activities.

The seismic survey system 100 includes a seismic source, illustrated as a vibrator 102, positioned on the surface region 104. The seismic source 102 is configured to generate seismic shock waves 110. The seismic shock wave, alternatively referred to as a seismic shot, refers to the controlled release of seismic energy into the subsurface using the seismic source 102, such as a vibroseis truck, air gun, or explosives. When the seismic shot 110 travels through the earth and is detected by seismic receivers such as geophones 108, the seismic trace is generated. The seismic shot may be a low-frequency seismic shot or a high-frequency seismic shot. The low-frequency seismic shot 110 means that the generated seismic waves primarily contain lower frequencies, which penetrate deeper into the subsurface. The high-frequency seismic shot means that the generated seismic waves primarily contain higher frequencies.

The seismic source 102 is implemented using a plurality of seismic energy generation mechanisms, including, but not limited to, vibroseis trucks, weight drop mechanisms, air guns, and controlled explosive charges. For example, in land-based seismic surveys, a vibroseis truck may generate controlled low-frequency seismic waves, whereas in applications requiring greater wave penetration, explosive charges may be detonated to create high-energy seismic shots. In some examples, the vibroseis truck generates a seismic sweep ranging from a few Hz to several hundred Hz, with a sweep length of approximately 10 seconds. The energy penetration depth for vibroseis sources may extend a few kilometers from the ground surface. In contrast, weight drop sources typically generate lower energy signals, with a frequency range of 10 Hz to 100 Hz and a penetration depth of approximately 800 to 1200 meters.

The seismic shock waves 110 generated by the seismic source 102 travel downward into the subsurface region 106 and interact with geological interfaces and structures located beneath the surface region 104. Upon encountering geological boundaries exhibiting contrasting acoustic impedances, a portion of the seismic shock waves 110 is reflected to form reflected waves. The reflected waves propagate upward through the subsurface region 106 toward the surface region 104.

The reflected waves are detected by a plurality of seismic receivers 108 disposed across the surface region 104. The seismic receivers 108 may be implemented as geophones. Each geophone 108 is a sensitive transducer configured to convert ground motion induced by the reflected waves into electrical signals. The electrical signals represent seismic traces. Each seismic trace refers to a recorded waveform representative of the seismic wave propagation path and the reflection characteristics of the geological interfaces. The seismic receivers 108 may be arranged linearly for two-dimensional (2D) seismic surveys or in grid configurations for three-dimensional (3D) seismic surveys. In one example, the seismic receivers 108 may be spaced from approximately 1 meter to 50 meters, depending on the resolution and scale requirements of the survey.

The surface region 104 refers to the portion of the Earth's surface on which the seismic source 102 and seismic receivers 108 are deployed. The surface region 104 may include land-based environments, such as plains, deserts, or mountainous terrain, or marine environments, such as oceans or inland water bodies. The subsurface region 106 refers to the volume of geological layers underlying the surface region 104 and subject to seismic exploration. The subsurface region 106 may include sedimentary layers, hydrocarbon reservoirs, mineral deposits, aquifers, voids, tunnels, and man-made objects such as landmines or buried pipelines.

The seismic survey implemented by the seismic survey system 100 comprises a systematic procedure of acquiring seismic data through controlled emission of the seismic shock waves 110 and recording of the corresponding reflected waves. The objective of the seismic survey is to analyze the seismic responses from subsurface structures to identify geological features, natural resources, and anthropogenic objects. The effectiveness of the seismic survey depends on various parameters including the characteristics of the seismic source 102, the density and spatial configuration of the seismic receivers, the frequency spectrum of the seismic shock waves 110, and the computational techniques used for processing the acquired seismic data.

Figure 2:
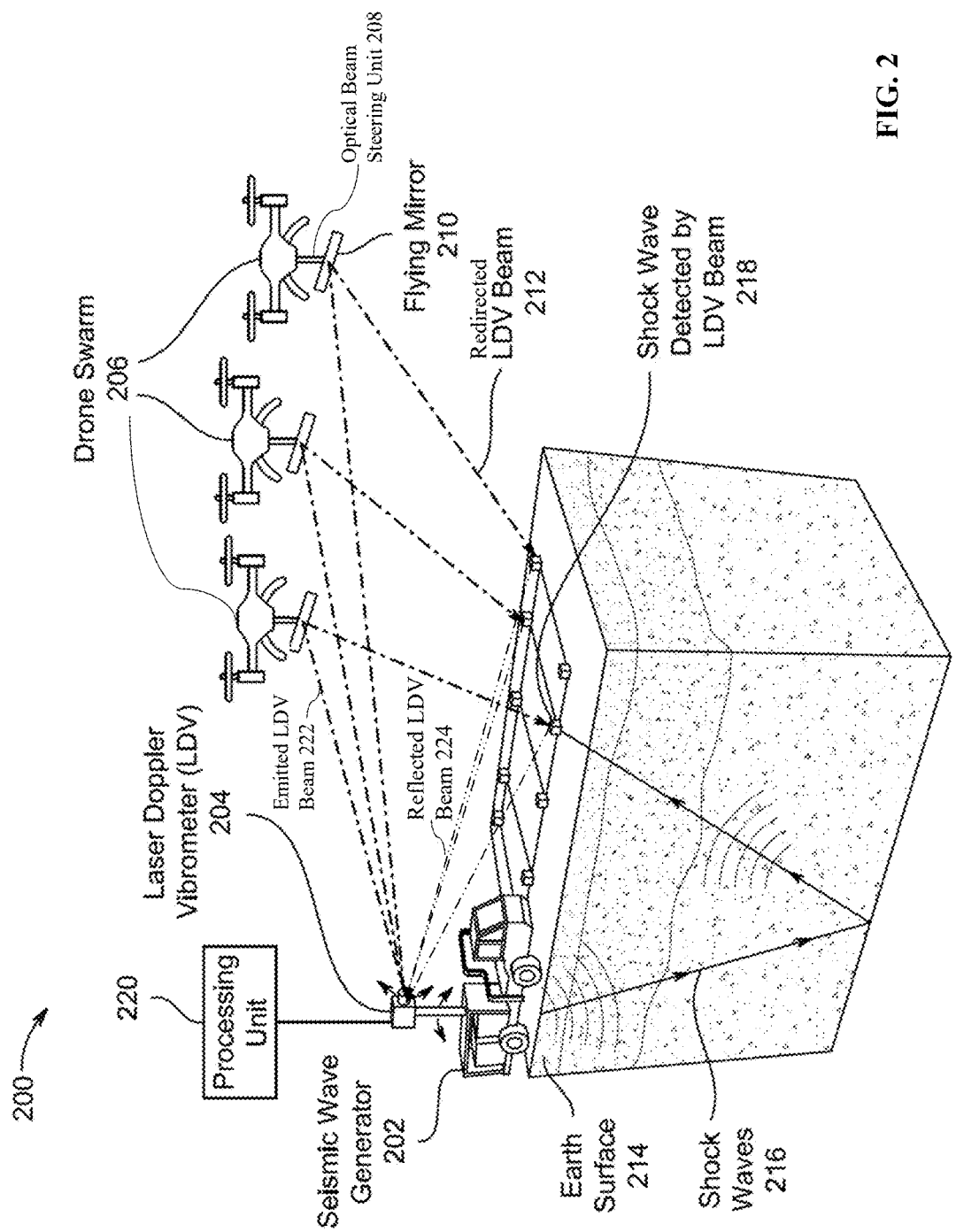
FIG. 2 illustrates a schematic diagram of a drone swarm-based seismic survey system using laser Doppler vibrometer (LDV) and flying mirrors, according to certain embodiments.

The survey system 200 illustrated in FIG. 2 is configured to detect underground objects in a subsurface region based on remote sensing of seismic shock waves reflected from geological interfaces. The seismic survey system 200 includes a seismic wave generator 202, a laser Doppler vibrometer (LDV) 204, a plurality of drones 206 each equipped with an optical beam steering unit 208, and a processing unit 220. The system 200 replaces traditional ground-mounted geophone arrays with a non-contact, aerially-distributed LDV-based sensing mechanism enabled by flying mirrors, for example.

The seismic survey system 200 includes a seismic wave generator 202 positioned at a first position on an Earth surface 214. The seismic wave generator 202 is configured to generate seismic shock waves 216 and transmit the seismic shock waves 216 from the Earth surface 214 into a subsurface region. The seismic wave generator 202 may be implemented as a vibroseis truck, weight-drop actuator, or controlled explosive charge. For instance, the vibroseis truck may generate controlled low-frequency seismic waves with sweep lengths of up to 10 seconds, while weight-drop systems generate lower energy signals for shallow subsurface imaging. The generated seismic shock waves 216 propagate through subsurface geological layers and are partially reflected at impedance-contrast interfaces, resulting in reflected waves 218. In one aspect, the frequency of the seismic shock waves 216 is less than 100 Hz.

The seismic survey system 200 further comprises a laser Doppler vibrometer (LDV) 204 located at a second position on the Earth surface 214. The LDV 204 is a non-contact optical measurement device configured to detect and quantify vibrational motion of a target surface by analyzing the Doppler shift in a reflected laser beam. The LDV 204 operates based on the Doppler effect, whereby the frequency of light is modulated by the velocity of the surface it reflects from. The resulting frequency shift is processed by the LDV to determine surface displacement, velocity, or acceleration. The LDV 204 may comprise a laser emitter, a photodetector, and a signal processor. The laser emitter directs a coherent laser beam toward a target surface. When the laser beam reflects off a vibrating surface, its frequency is altered in proportion to the surface velocity. The photodetector receives the reflected beam and converts it into an electrical signal containing the Doppler frequency information, which is then interpreted by the signal processor to quantify the vibration characteristics.

Referring to FIG. 2, the LDV 204 is configured to emit a plurality of LDV beams 222 directed toward a plurality of drones 206. LDV beams refer to the laser beams emitted by the LDV 204 for the purpose of non-contact vibration measurement. The LDV beams 222 are coherent laser signals, typically monochromatic and highly collimated, that travel from the LDV 204 toward a target surface, where they are reflected back and analyzed based on Doppler frequency shifts. In one aspect, a bandwidth of the LDV 204 is in a range of tens of kilohertz.

Each of the plurality of drones 206 is positioned in the vicinity of the LDV 204 and is configured to carry an optical beam steering unit 208. For instance, the optical beam steering unit 208 can be implemented as a motorized optical assembly that includes at least one motorized mirror 210 mounted on a multi-axis gimbal. The motorized mirror 210 redirects the corresponding LDV beam 222 emitted from the LDV 204 to the Earth surface 214 in a predetermined angle, thereby forming the redirected beam 212. The predetermined angle refers to a fixed or dynamically calibrated angular orientation at which the optical beam steering unit 208 controls the motorized mirror 210 to direct the corresponding LDV beam 212 toward the Earth surface 214. The predetermined angle is selected to obtain optimal incidence of the LDV beam on the target surface for effective detection of surface vibrations modulated by reflected seismic shock waves 216.

In one embodiment, the predetermined angle may be configured based on the relative geometric positioning between the laser Doppler vibrometer (LDV), the drone, and the ground surface. For example, the predetermined angle may range between approximately 30 degrees and 75 degrees with respect to the vertical axis, depending on flight altitude, beam divergence, and target resolution requirements.

The optical beam steering unit 208 is configured to dynamically alter the orientation of the mirror 210 in response to control signals, thereby changing the direction of an incoming LDV beam 222 toward a designated point on the Earth surface 214. The mirror 210 may be constructed from lightweight reflective materials such as aluminum-coated glass or polymer substrates to ensure minimal payload requirements and high reflection efficiency. The optical beam steering unit 208 may be mounted on each drone 206 using a gimbal mechanism to allow angular control for precise beam reflection based on the predetermined angle.

The gimbal mechanism supporting the mirror 210 results in controlled rotation about pitch, yaw, and roll axes, allowing precise beam alignment across a broad angular range.

The LDV beams 212, redirected by the optical beam steering unit 208 travel toward target locations on the Earth surface 214. These LDV beams 212 are then reflected back from the Earth surface 214 as LDV return signals. The reflected LDV beams 224 carry Doppler frequency shifts proportional to the vibration or surface motion caused by the seismic shock waves 216. The LDV 204 is configured to detect the reflected LDV beams 224 and to generate a seismic dataset representing seismic signals induced by the reflected seismic waves 218 originating from the subsurface region.

The plurality of drones 206 carrying the optical beam steering units 208 are implemented as microdrones with payload capacities of a few hundred grams. In one aspect, a weight of each drone of the plurality of drones is less than a weight threshold. The weight threshold refers to a design constraint specifying that each of the plurality of drones 206 must have a total weight that does not exceed a predetermined upper limit. The weight threshold is set to render safe, efficient, and stable operation of the drones, particularly when carrying optical beam steering units used for LDV beam redirection.

Each of the plurality of drones 206 is configured to maintain a hovering position and orientation to enable accurate beam steering. The microdrone configuration minimizes airborne vibration noise and enhances the LDV signal-to-noise ratio, thus improving measurement sensitivity and reliability. The small payload requirement allows flexible, cost-effective deployment across wide areas without the complexity associated with heavier drone platforms. The use of optical beam steering units 208 mounted on lightweight drones 206 further eliminates the need for physical installation of ground-mounted sensors, thereby accelerating setup time and reducing deployment costs.

The seismic survey system 200 includes a processing unit 220 operatively connected to the LDV 204. The processing unit 220 is configured to receive the seismic dataset generated by the LDV 204 and to process the seismic dataset to identify underground objects located within the subsurface region. The processing unit 220 is further configured to determine a geological model, based on the seismic dataset, providing a two-dimensional or three-dimensional representation of the subsurface region in the vicinity of the seismic wave generator 202. The geological model may be used to identify underground objects such as oil or gas reservoirs, voids, or man-made objects such as trenches, traps, and landmines.

The processing unit 220 includes a communications unit, electrical circuitry, and a memory having program instructions executable by at least one processor. The communications unit is configured to enable real-time data exchange between the processing unit 220 and external systems, such as remote monitoring stations, cloud storage infrastructure, or mobile control devices. The electrical circuitry comprises signal processing modules including digital signal processors (DSPs), application-specific integrated circuits (ASICs), and hardware accelerators for seismic data analysis.

The processor of the processing unit 220 may be implemented using a central processing unit (CPU), a graphics processing unit (GPU), a digital signal processor (DSP), or a field-programmable gate array (FPGA). In one embodiment, the processor may further include an application-specific integrated circuit (ASIC), application-specific standard product (ASSP), complex programmable logic device (CPLD), or a system-on-chip (SoC) module. The processor may be configured to execute seismic processing tasks including time-domain filtering, frequency-domain analysis, noise suppression, surface wave attenuation, and reflection event detection.

The memory of the processing unit 220 includes volatile and non-volatile storage media such as random access memory (RAM), solid-state drives (SSD), read-only memory (ROM), and electronically erasable programmable read-only memory (EEPROM). The memory is configured to store seismic datasets, processing algorithms, and operating instructions. In some examples, the memory is implemented using distributed computing architectures or networked storage systems to ensure redundancy, scalability, and high-speed access. The processing unit 220 may also support integration with external databases using MySQL, Oracle, or NoSQL architectures for extended data handling.

In certain embodiments, the processing unit 220 includes network interface circuitry for supporting communications over wired and wireless networks. Supported network protocols may include TCP/IP, HTTP, SSH, WebRTC, and MQTT. The processing unit 220 may transmit and receive seismic data over Wi-Fi (IEEE 802.11), Bluetooth, ZigBee, cellular networks (LTE/5G), or satellite links. In security-critical environments, the processing unit 220 may include encryption modules for secure data transmission and integrity validation.

Figure 3A:
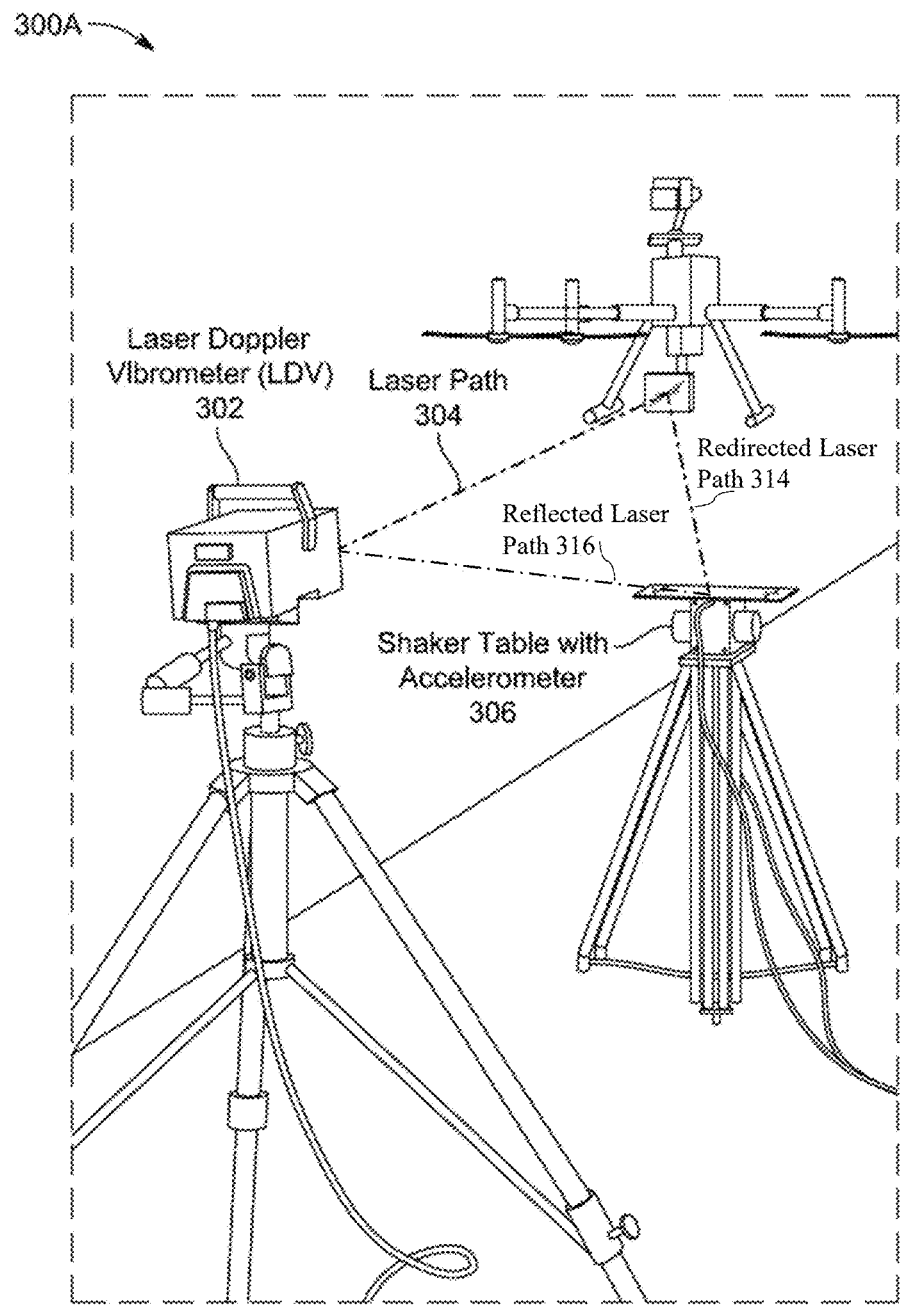
FIG. 3A illustrates a schematic diagram of a ground-based proof-of-concept setup for validating the flying mirror seismic sensing configuration, according to certain embodiments.

FIG. 3A illustrates a proof-of-concept setup 300A demonstrating a flying mirror-based seismic signal acquisition configuration. The configuration 300A includes a laser Doppler vibrometer (LDV) 302 positioned on the ground, a shaker table with an attached accelerometer 306. The LDV 302 is configured to emit a laser beam along a line-of-sight laser path 304. The LDV 302 may be implemented using an industrial-grade vibrometer such as the Qtec@ model from Polytec®, capable of detecting vibration-induced Doppler frequency shifts with high temporal resolution. The accelerometer functions as a reference contact sensor, capturing the actual surface vibration for validation purposes. The LDV 302 and the accelerometer operate simultaneously to provide a comparative measurement of surface vibration using contact and non-contact methods.

Figure 3B:
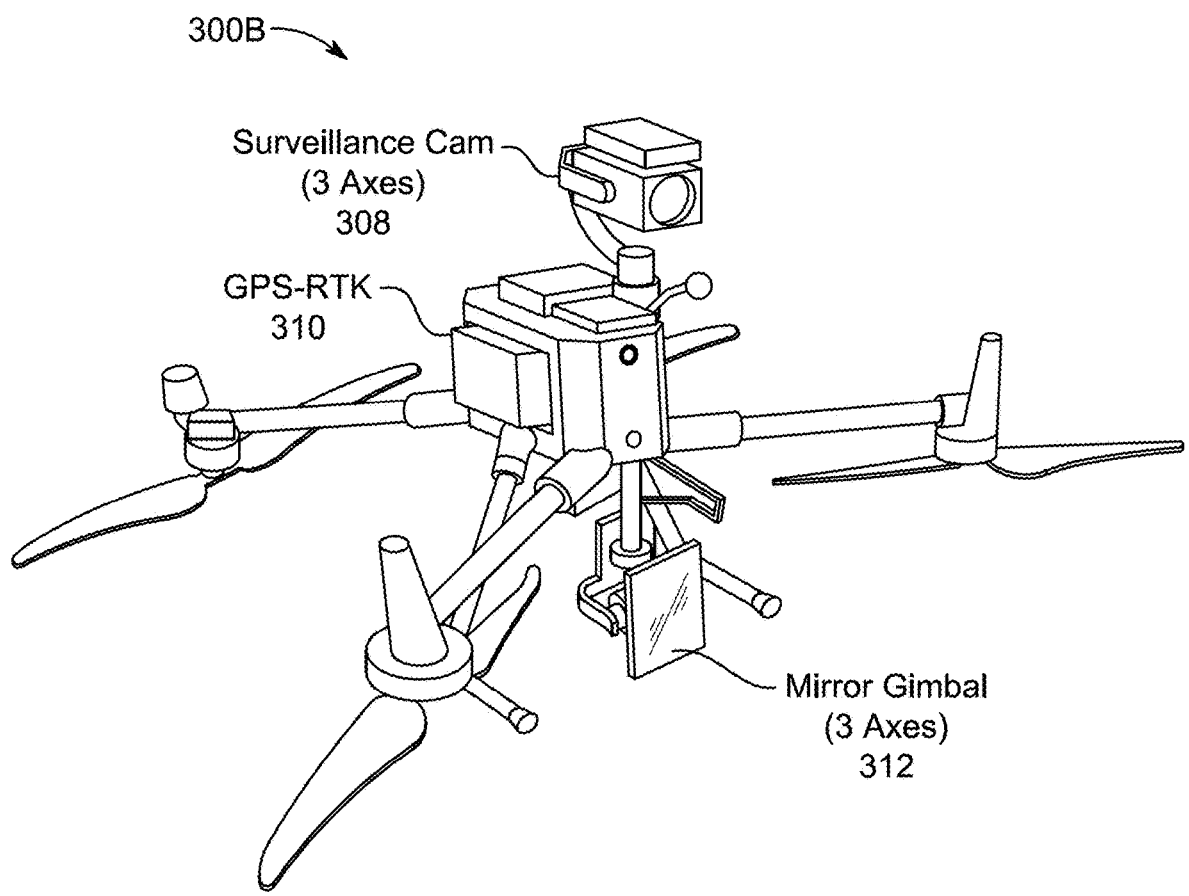
FIG. 3B illustrates a schematic diagram of a drone equipped with a reflective mirror gimbal used for steering LDV beams in a seismic survey, according to certain embodiments.

FIG. 3B illustrates a drone 300B equipped with a flying mirror gimbal 312 used to redirect LDV beams the laser beam along the laser path 304 toward a vibration source (i.e., a vibrating surface of the shaker table 306), forming a redirected laser beam along a laser path 314. A reflected laser beam then returns from the vibrating surface along a laser path 316 toward the LDV 302. The drone 300B is fitted with a 3-axis motorized mirror gimbal 312, which includes a reflective surface capable of changing the direction of incoming LDV beams toward the vibrating surface. The drone 300B may be implemented using commercially available microdrones such as the DJI M300 model, which provides stable flight dynamics, a Global Positioning System-Real-Time Kinematic (GPS-RTK) module 310, and sufficient payload capacity for mirror-based applications. The GPS-RTK module 310 refers to a high-precision satellite navigation component integrated into each drone of the drone swarm. The GPS-RIK module 310 is implemented to achieve centimeter-level positional accuracy during seismic surveying operations that involve redirecting LDV beams to specific ground coordinates via flying mirrors.

A surveillance camera 308 is mounted on the drone 300B to monitor operational surroundings. The drone 300B is further equipped with a GPS-RTK module 310 for precise positional tracking. The mirror gimbal 312 allows dynamic redirection of the laser beam in real-time, facilitating measurements from various angles and positions. The mirror-based reflection of LDV beams ensures that non-contact seismic sensing can be achieved over extended areas without direct instrument contact with the measured surface.

Figure 3C:
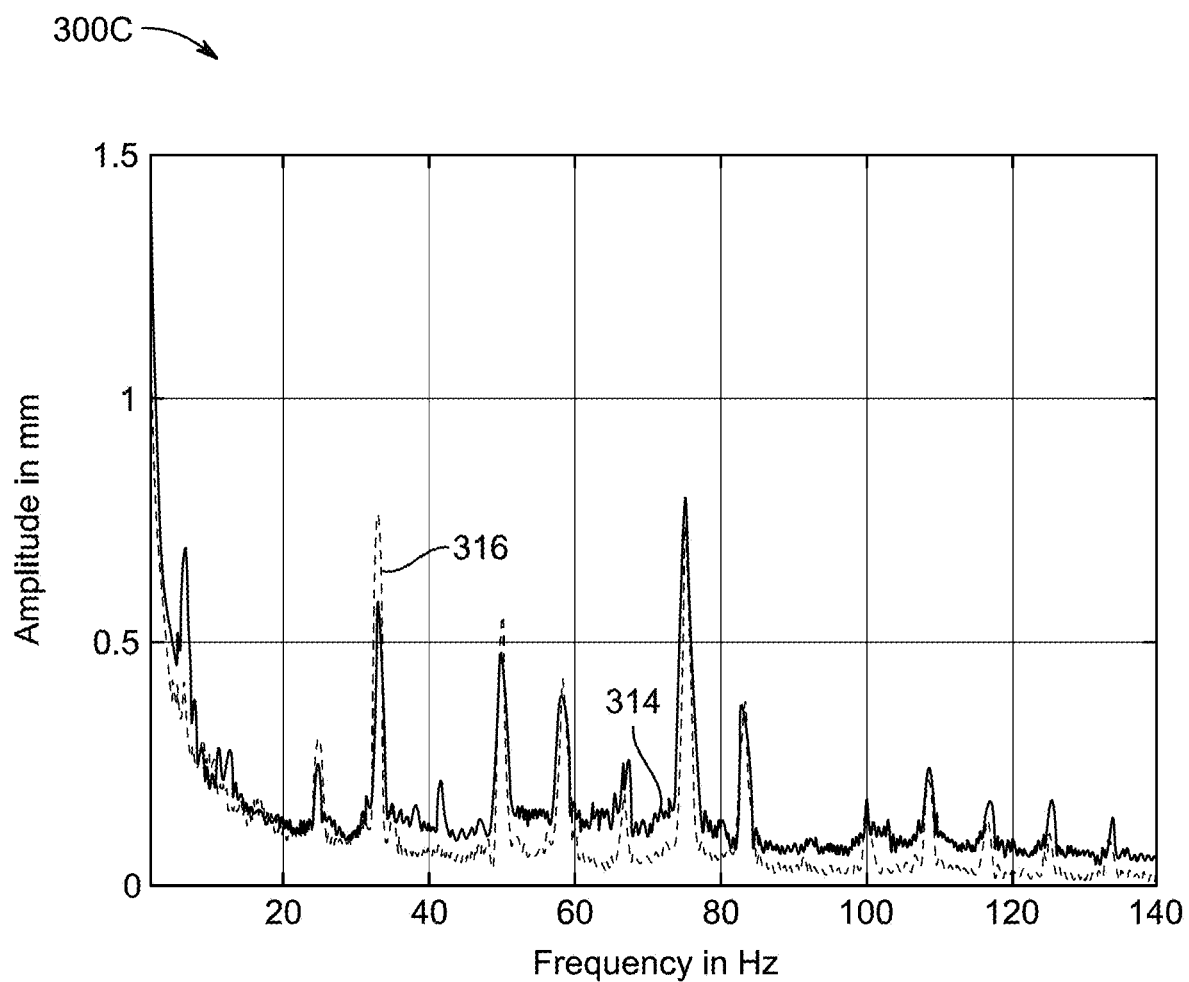
FIG. 3C illustrates a schematic plot comparing vibration measurements obtained using a flying mirror-based LDV setup and a contact accelerometer, according to certain embodiments.

FIG. 3C presents a vibration comparison plot 300C illustrating frequency-domain measurement results obtained using the LDV-flying mirror configuration and a contact accelerometer. The plot 300C compares vibration amplitudes across a frequency range from 0 Hz to 140 Hz. Curve 314 represents the measurement obtained from the drone-assisted flying mirror configuration, while curve 316 corresponds to the accelerometer measurement. The results demonstrate a close match of approximately 90% between the two datasets in the low-frequency range up to 100 Hz. The high correlation confirms that the LDV beams reflected by the flying mirror accurately capture low-frequency vibration characteristics similar to seismic shock waves. The plot validates the effectiveness of drone-carried optical beam steering units in facilitating reliable remote seismic signal acquisition.

Figure 4A:
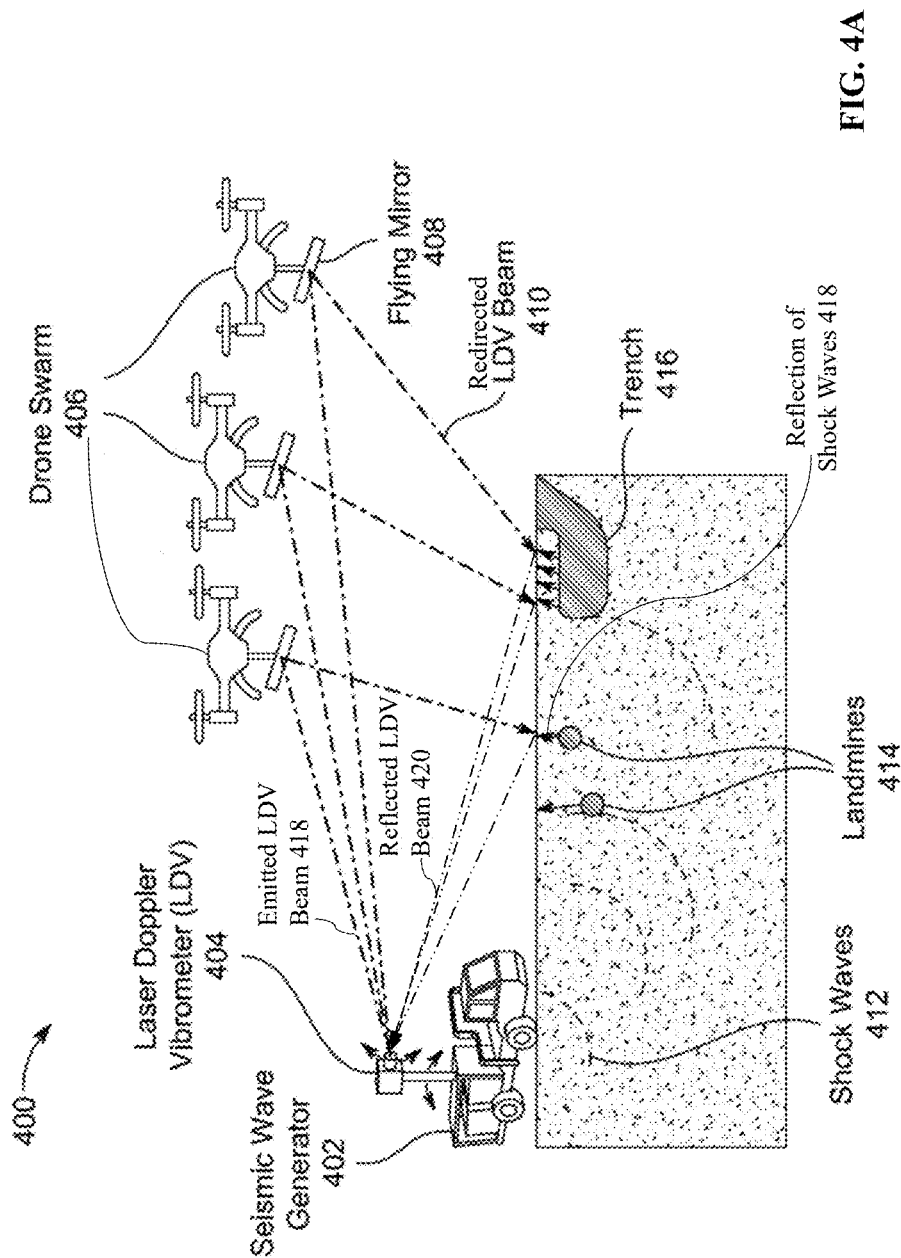
FIG. 4A illustrates a schematic diagram of a drone swarm-based seismic survey system configured for landmine and trench detection, according to certain embodiments.

FIG. 4A illustrates a drone swarm-based seismic survey system 400 configured for landmine and french detection using seismic wave reflection and remote laser Doppler vibrometry. The seismic survey system 400 is operable to detect buried subsurface objects such as landmines 414 and trenches 416 by transmitting seismic shock waves 412 into a subsurface region and detecting reflected signals using laser Doppler vibrometer (LDV) technology.

The seismic survey system 400 comprises a seismic wave generator 402 positioned on an Earth surface. The seismic wave generator 402 is configured to generate seismic shock waves 412 and to transmit the seismic shock waves 412 into a subsurface region underlying the Earth surface. The seismic wave generator 402 may be implemented using a vibroseis truck, a weight-drop actuator, or a controlled explosive charge, depending on the required frequency and depth of seismic wave penetration. The seismic shock waves 412 travel downward through the subsurface region and are reflected by underground objects, including the landmines 414 and the trench 416.

The system 400 includes a LDV 404 located on the Earth surface and positioned in proximity to the seismic wave generator 402. The LDV 404 is configured to emit one or more LDV beams 418 upward toward a plurality of drones collectively forming a drone swarm 406. The drone swarm 406 comprises multiple drones operating in a hovering position above the Earth surface. Each drone in the drone swarm 406 is configured to carry a flying mirror 408. The flying mirror 408 is implemented using a motorized reflective optical element configured to steer the LDV beams 418 toward selected ground locations.

The flying mirrors 408 receive the LDV beams 418 emitted by the LDV 404 and redirect them toward the Earth surface at incident angles appropriate for capturing ground vibration data, forming redirected LDV beams 410. The redirected LDV beams 410 are reflected off the ground surface after being modulated by vibrations caused by the reflected seismic shock waves 418, forming reflected LDV beams 420. These reflected LDV beams 420 return to the LDV 404, carrying Doppler frequency shifts that represent vibration patterns induced by the reflected seismic energy.

The underground objects in the subsurface region, including the landmines 414 and the trench 416, exhibit seismic impedance contrasts that cause the seismic shock waves 412 to be reflected back toward the surface as reflection of shock waves 418. The reflection of shock waves 418 is influenced by the material, shape, and burial depth of the underground objects. The interaction between the seismic shock waves 412 and the landmines 414 or trench 416 generates unique vibration signatures at the Earth surface, which are captured by the reflected LDV beams 420 and subsequently detected by the LDV 404.

The LDV 404 is operatively connected to a processing unit (not illustrated in FIG. 4) that is configured to receive and analyze the seismic data extracted from the reflected LDV beams 420. The processing unit is configured to apply signal processing techniques such as filtering, time-frequency analysis, and machine learning-based classification to identify the location and type of buried objects. Based on the analysis of the reflection of shock waves 418, the system 400 can accurately determine the presence of landmines 414 and trenches 416 within the scanned area.

The use of the drone swarm 406 and the flying mirrors 408 enables wide-area, flexible, and non-contact measurement of seismic reflections. Unlike conventional ground-based sensors, the aerial configuration allows rapid deployment and high-resolution coverage of dangerous or inaccessible terrains. The seismic survey system 400 provides the ability to detect both metallic and non-metallic underground objects, such as landmines, and can be scaled to survey large operational zones with minimal logistical requirements. The system 400 is particularly suited for military and humanitarian demining applications, where safety, coverage area, and accuracy are of utmost importance.

Figure 4B:
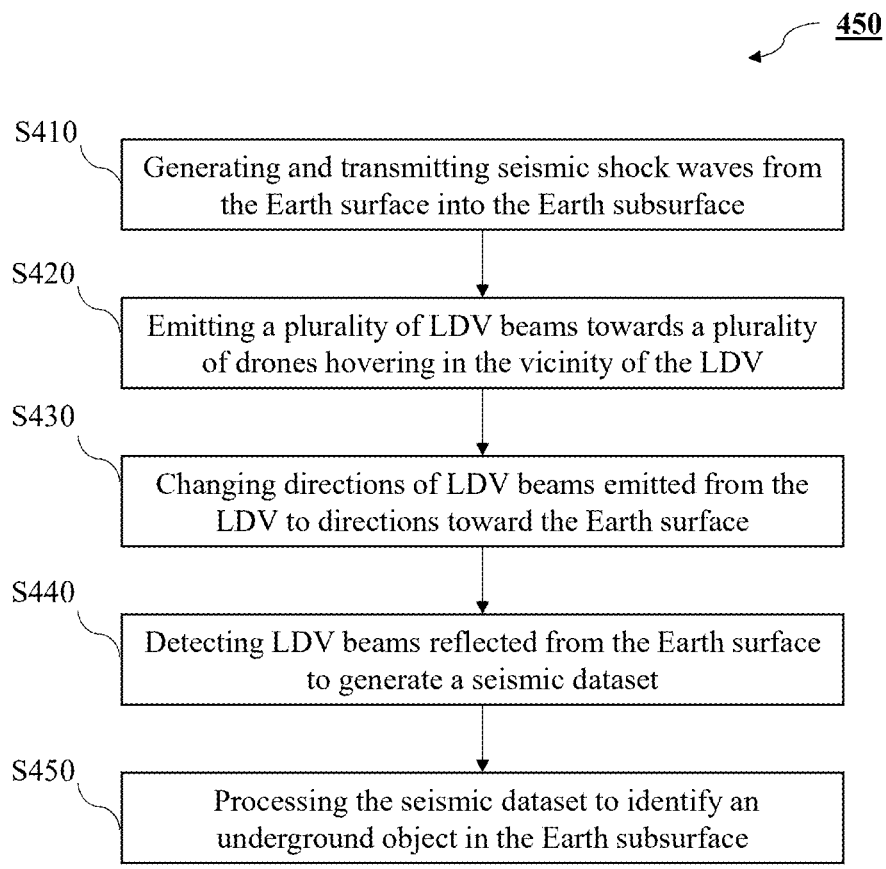
FIG. 4B illustrates a flow chart of a drone swarm-based seismic survey method, according to certain embodiments.

In one implementation, a method for detecting an underground object based on seismic survey is described. As shown in FIG. 4B, the method 450 includes generating, by a seismic wave generator placed at a first position on an Earth surface, seismic shock waves and transmitting the seismic shock waves from the Earth surface into an Earth subsurface (step S410), emitting, by a laser Doppler vibrometer (LDV) placed at a second position on the Earth surface, a plurality of LDV beams towards a plurality of drones hovering in vicinity of the LDV (step S420), where each drone carries an optical beam steering unit, changing, by each optical beam steering unit, a direction of a corresponding LDV beam emitted from the LDV to a direction toward the Earth surface (step S430), detecting, by the LDV, LDV beams reflected from the Earth surface to generate a seismic dataset (step S440), the seismic dataset representing seismic signals from seismic events caused in the Earth subsurface by the seismic shock waves, and processing, by the processing unit, the seismic dataset to identify an underground object in the Earth subsurface (step S450).

In some embodiments, the step of processing the seismic dataset further comprises determining a geological model based on the seismic dataset, the geological model providing a two-dimensional or three-dimensional representation of the Earth subsurface in vicinity of the first position, and detecting the underground object based on the geological model.

In some embodiments, each optical beam steering unit is a motorized mirror that reflects the corresponding LDV beam emitted from the LDV to the Earth surface in a predetermined angle.

In some embodiments, each drone carries the optical beam steering unit by a gimbal.

In some embodiments, a frequency of the seismic shock waves is less than 100 Hz.

In some embodiments, a bandwidth of the LDV is in a range of tens of kilohertz.

In some embodiments, the underground object includes a metal material or a non-metal material.

In some embodiments, the underground object is a natural source or an artificial object.

In some embodiments, the natural source is oil or gas, and the artificial object is a trench, a trap, or a landmine.

In some embodiments, a weight of each drone of the plurality of drones is less than a weight threshold.

In one implementation, a system for detecting an underground object based on seismic survey is described. The system includes a seismic wave generator placed at a first position on an Earth surface, a laser Doppler vibrometer (LDV) placed at a second position on the Earth surface, a plurality of drones hovering in vicinity of the LDV, each drone carrying an optical beam steering unit, and a processing unit. The seismic wave generator is configured to generate seismic shock waves and transmit the seismic shock waves from the Earth surface into an Earth subsurface. The LDV is configured to emit a plurality of LDV beams towards the plurality of drones. Each optical beam steering unit is configured to change a direction of a corresponding LDV beam emitted from the LDV to a direction toward the Earth surface. The LDV is configured to detect LDV beams reflected from the Earth surface to generate a seismic dataset, the seismic dataset representing seismic signals from seismic events caused in the Earth subsurface by the seismic shock waves. The processing unit is configured to process the seismic dataset to identify an underground object in the Earth subsurface.

In some embodiments, the processing unit is configured to determine a geological model based on the seismic dataset and identify the underground object based on the geological model, the geological model providing a two-dimensional or three-dimensional representation of the Earth subsurface in vicinity of the first position.

In some embodiments, each optical beam steering unit is a motorized mirror that reflects the corresponding LDV beam emitted from the LDV to the Earth surface in a predetermined angle.

In some embodiments, each drone carries the optical beam steering unit by a gimbal.

In some embodiments, a frequency of the seismic shock waves is less than 100 Hz.

In some embodiments, a bandwidth of the LDV is in a range of tens of kilohertz.

In some embodiments, the underground object includes a metal material or a non-metal material.

In some embodiments, the underground object is a natural source or an artificial object.

In some embodiments, the natural source is oil or gas, and the artificial object is a trench, a trap, or a landmine.

In some embodiments, a weight of each drone of the plurality of drones is less than a weight threshold.

Next, further details of the hardware description of the computing environment according to exemplary embodiments is described with reference to FIG. 5, In FIG. 5, a controller 500 is described as representative of the processing unit 220 of FIG. 2 in which the controller is a computing device which includes a CPU 501 which performs the processes described above/below. The process data and instructions may be stored in memory 502. These processes and instructions may also be stored on a storage medium disk 504 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 501, 503 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 501 or CPU 503 may be a Xenon or Core processor from Intel of America or an Opteron processor from AMD of America, or may be other processor types that would be recognized by one of ordinary skill in the art. Alternatively, the CPU 501, 503 may be implemented on an FPGA, ASIC, PLD or using discrete logic circuits, as one of ordinary skill in the art would recognize. Further, CPU 501, 503 may be implemented as multiple processors cooperatively working in parallel to perform the instructions of the inventive processes described above.

Figure 5:
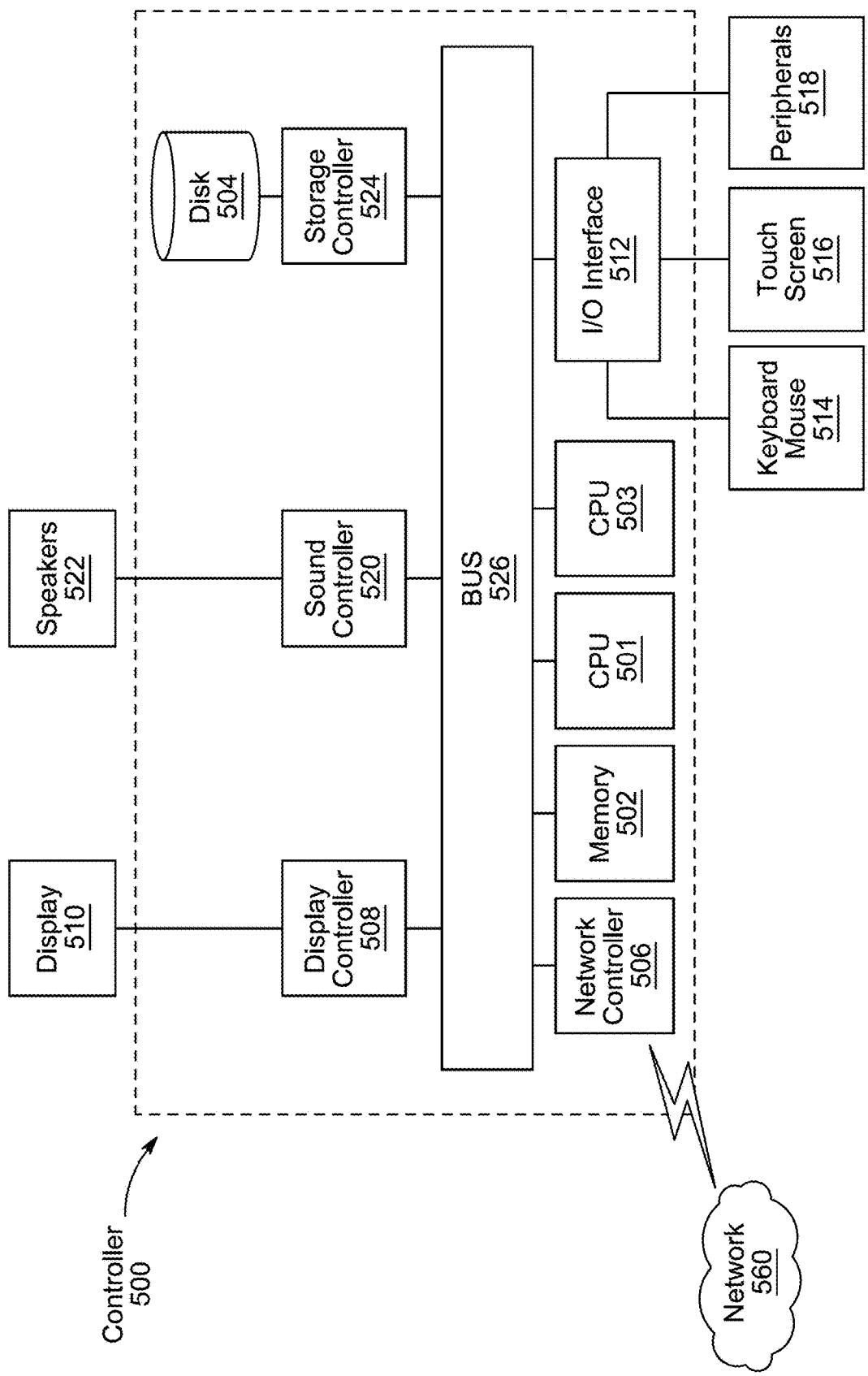
FIG. 5 is an illustration of a non-limiting example of details of computing hardware used in the computing system, according to certain embodiments.

The computing device in FIG. 5 also includes a network controller 506, such as an Intel Ethernet PRO network interface card from Intel Corporation of America, for interfacing with network 560. As can be appreciated, the network 560 can be a public network, such as the Internet, or a private network such as an LAN or WAN network, or any combination thereof and can also include PSTN or ISDN subnetworks. The network 560 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 508, such as a NVIDIA GeForce GTX or Quadro graphics adaptor from NVIDIA Corporation of America for interfacing with display 510, such as a Hewlett Packard HPL2445w LCD monitor. A general purpose I/O interface 512 interfaces with a keyboard and/or mouse 514 as well as a touch screen panel 516 on or separate from display 510. General purpose I/O interface also connects to a variety of peripherals 518 including printers and scanners, such as an OfficeJet or DeskJet from Hewlett Packard.

A sound controller 520 is also provided in the computing device such as Sound Blaster X-Fi Titanium from Creative, to interface with speakers/microphone 522 thereby providing sounds and/or music.

The general purpose storage controller 524 connects the storage medium disk 504 with communication bus 526, which may be an ISA, EISA, VESA, PCI, or similar, for interconnecting all of the components of the computing device. A description of the general features and functionality of the display 510, keyboard and/or mouse 514, as well as the display controller 508, storage controller 524, network controller 506, sound controller 520, and general purpose I/O interface 512 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 6.

Figure 6:
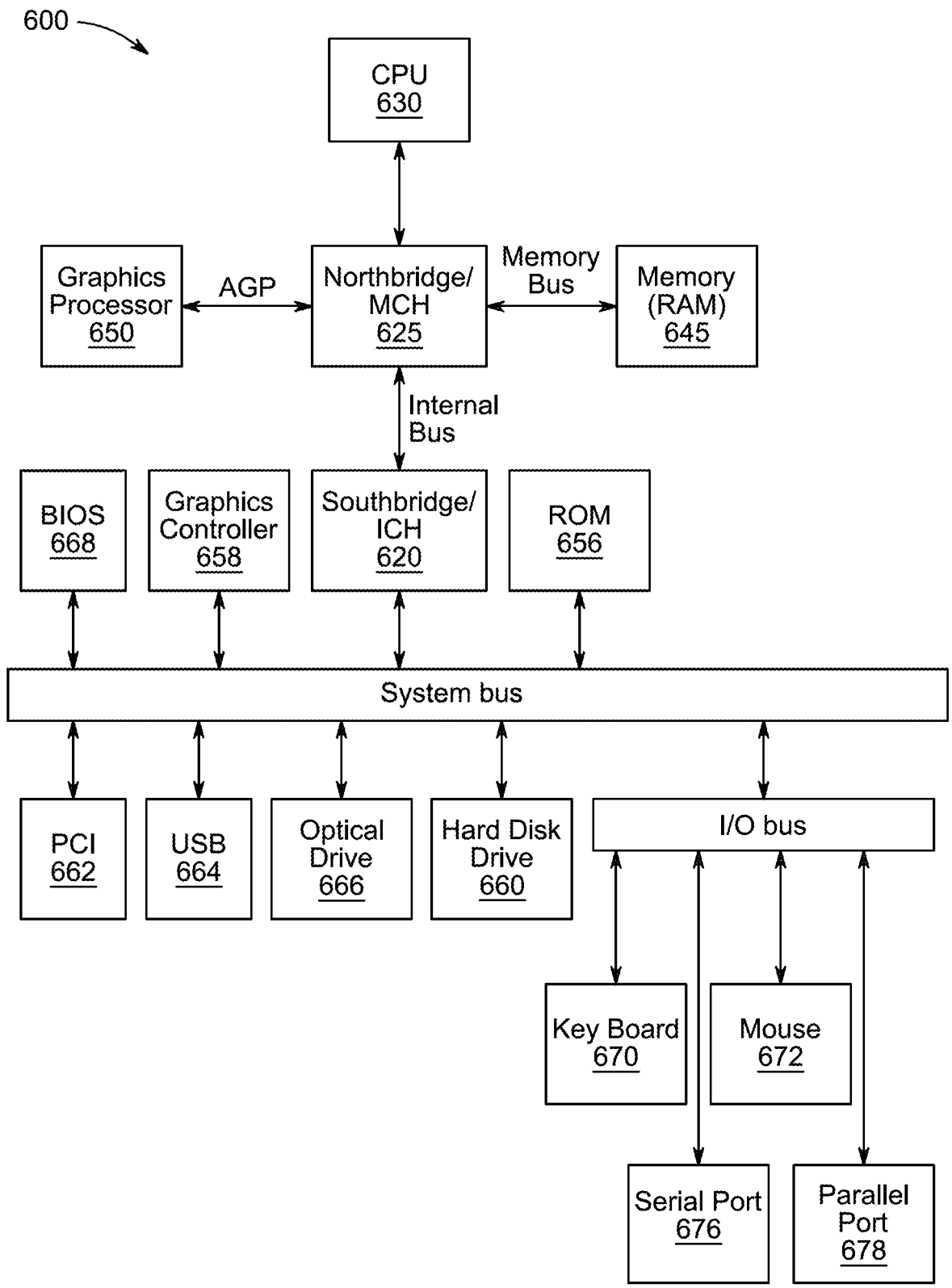
FIG. 6 is an exemplary schematic diagram of a data processing system used within the computing system, according to certain embodiments.

FIG. 6 shows a schematic diagram of a data processing system, according to certain embodiments, for performing the functions of the exemplary embodiments. The data processing system is an example of a computer in which code or instructions implementing the processes of the illustrative embodiments may be located.

In FIG. 6, data processing system 600 employs a hub architecture including a north bridge and memory controller hub (NB/MCH) 625 and a south bridge and input/output (I/O) controller hub (SB/ICH) 620. The central processing unit (CPU) 630 is connected to NB/MCH 625. The NB/MCH 625 also connects to the memory 645 via a memory bus, and connects to the graphics processor 650 via an accelerated graphics port (AGP). The NB/MCH 625 also connects to the SB/ICH 620 via an internal bus (e.g., a unified media interface or a direct media interface). The CPU Processing unit 630 may contain one or more processors and even may be implemented using one or more heterogeneous processor systems.

Figure 7:
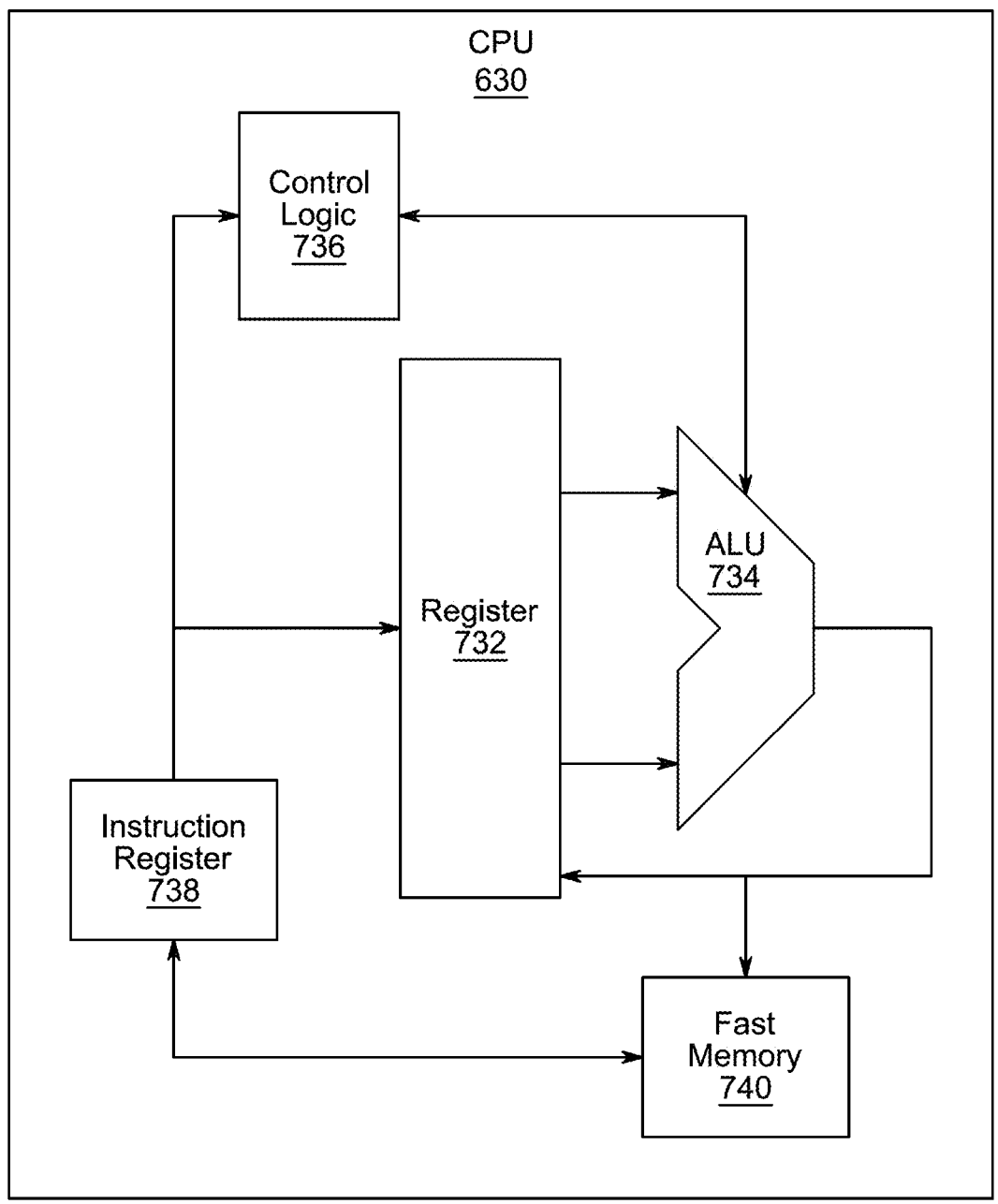
FIG. 7 is an exemplary schematic diagram of a processor used with the computing system, according to certain embodiments.

For example, FIG. 7 shows one implementation of CPU 630. In one implementation, the instruction register 738 retrieves instructions from the fast memory 740. At least part of these instructions are fetched from the instruction register 738 by the control logic 736 and interpreted according to the instruction set architecture of the CPU 630. Part of the instructions can also be directed to the register 732. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 734 that loads values from the register 732 and performs logical and mathematical operations on the loaded values according to the instructions. The results from these operations can be feedback into the register and/or stored in the fast memory 740. According to certain implementations, the instruction set architecture of the CPU 630 can use a reduced instruction set architecture, a complex instruction set architecture, a vector processor architecture, a very large instruction word architecture. Furthermore, the CPU 630 can be based on the Von Neuman model or the Harvard model. The CPU 630 can be a digital signal processor, an FPGA, an ASIC, a PLA, a PLD, or a CPLD. Further, the CPU 630 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 6, the data processing system 600 can include that the SB/ICH 620 is coupled through a system bus to an I/O Bus, a read only memory (ROM) 656, universal serial bus (USB) port 664, a flash binary input/output system (BIOS) 668, and a graphics controller 658. PCI/PCIe devices can also be coupled to SB/ICH 688 through a PCI bus 662.

The PCI devices may include, for example, Ethernet adapters, add-in cards, and PC cards for notebook computers. The Hard disk drive 660 and CD-ROM 666 can use, for example, an integrated drive electronics (IDE) or serial advanced technology attachment (SATA) interface. In one implementation the I/O bus can include a super I/O (SIO) device.

Further, the hard disk drive (HDD) 760 and optical drive 666 can also be coupled to the SB/ICH 620 through a system bus. In one implementation, a keyboard 670, a mouse 672, a parallel port 678, and a serial port 676 can be connected to the system bus through the I/O bus. Other peripherals and devices that can be connected to the SB/ICH 620 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 8:
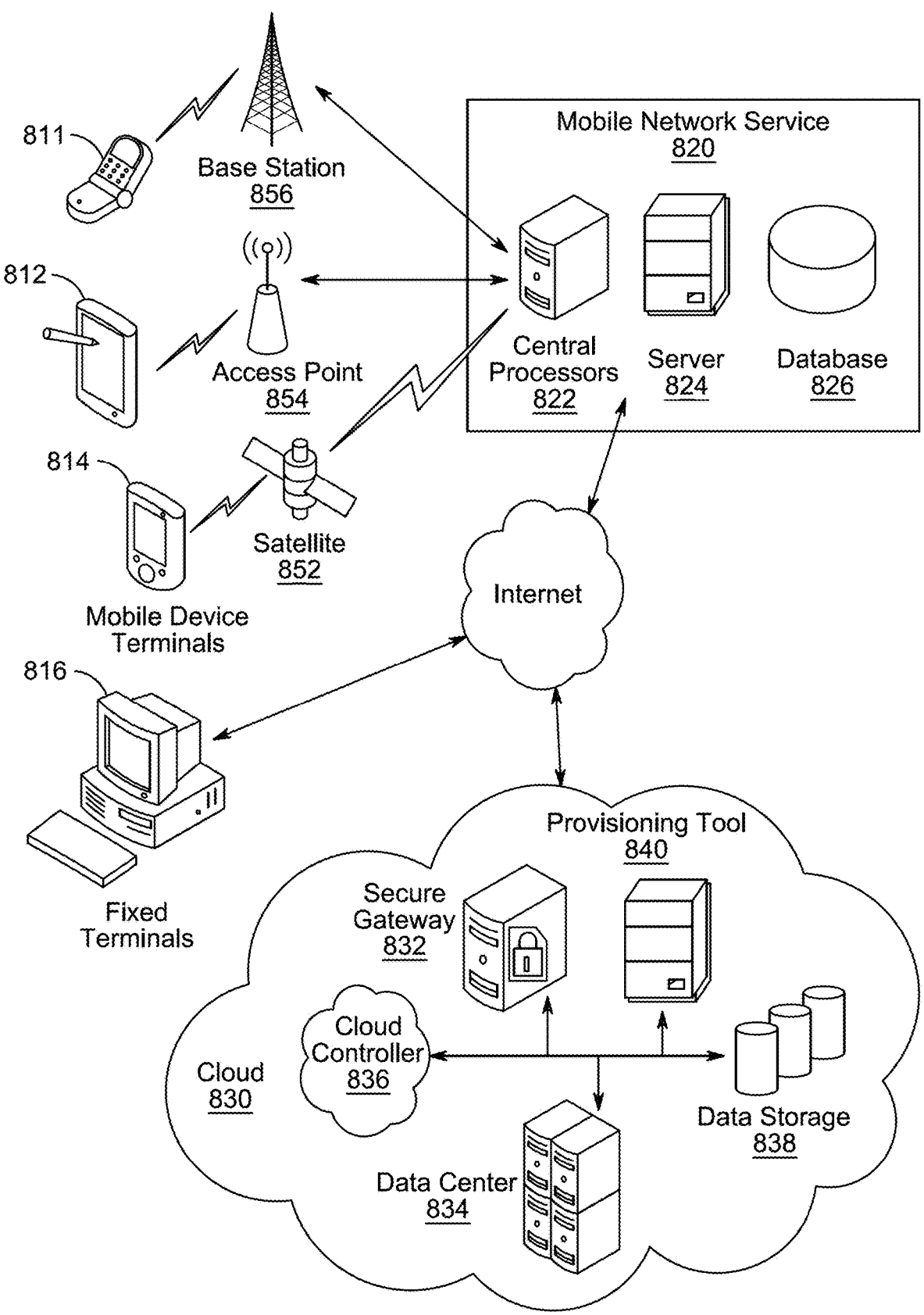
FIG. 8 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 830 including a cloud controller 836, a secure gateway 832, a data center 834, data storage 838 and a provisioning tool 840, and mobile network services 820 including central processors 822, a server 824 and a database 826, which may share processing, as shown by FIG. 8, in addition to various human interface and communication devices (e.g., display monitors 816, smart phones 89, tablets 812, personal digital assistants (PDAs) 814). The network may be a private network, such as a LAN, satellite 852 or WAN 854, or be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A method for detecting an underground object based on seismic survey, comprising:
by a seismic wave generator placed at a first position on an Earth surface, generating seismic shock waves and transmitting the seismic shock waves from the Earth surface into an Earth subsurface;
by a laser Doppler vibrometer (LDV) placed at a second position on the Earth surface, emitting a plurality of LDV beams towards a plurality of drones hovering in vicinity of the LDV, where each drone carries an optical beam steering unit;
by each optical beam steering unit, changing a direction of a corresponding LDV beam emitted from the LDV to a direction toward the Earth surface;
by the LDV, detecting LDV beams reflected from the Earth surface to generate a seismic dataset, the seismic dataset representing seismic signals from seismic events caused in the Earth subsurface by the seismic shock waves; and
by the processing unit, processing the seismic dataset to identify an underground object in the Earth subsurface.

2. The method of claim 1, wherein the step of processing the seismic dataset further comprises:

determining a geological model based on the seismic dataset, the geological model providing a two-dimensional or three-dimensional representation of the Earth subsurface in vicinity of the first position, and detecting the underground object based on the geological model.

3. The method of claim 1, wherein each optical beam steering unit is a motorized mirror that reflects the corresponding LDV beam emitted from the LDV to the Earth surface in a predetermined angle.

4. The method of claim 1, wherein each drone carries the optical beam steering unit by a gimbal.

5. The method of claim 1, wherein a frequency of the seismic shock waves is less than 100 Hz.

6. The method of claim 1, wherein a bandwidth of the LDV is in a range of tens of kilohertz.

7. The method of claim 1, wherein the underground object includes a metal material.

8. The method of claim 1, wherein the underground object is a natural source or an artificial object.

9. The method of claim 8, wherein the natural source is oil or gas, and the artificial object is a trench, a trap, or a landmine.

10. The method of claim 1, wherein a weight of each drone of the plurality of drones is less than a weight threshold.

11. A system for detecting an underground object based on seismic survey, comprising:

a seismic wave generator placed at a first position on an Earth surface;

a laser Doppler vibrometer (LDV) placed at a second position on the Earth surface;

a plurality of drones hovering in vicinity of the LDV, each drone carrying an optical beam steering unit; and a processing unit, wherein the seismic wave generator generates seismic shock waves and transmits the seismic shock waves from the Earth surface into an Earth subsurface, the LDV emits a plurality of LDV beams towards the plurality of drones, each optical beam steering unit changes a direction of a corresponding LDV beam emitted from the LDV to a direction toward the Earth surface, the LDV detects LDV beams reflected from the Earth surface to generate a seismic dataset, the seismic dataset representing seismic signals from seismic events caused in the Earth subsurface by the seismic shock waves, and the processing unit processes the seismic dataset to identify an underground object in the Earth subsurface.

12. The system of claim 11, wherein the processing unit determines a geological model based on the seismic dataset and identifies the underground object based on the geological model, the geological model providing a two-dimensional or three-dimensional representation of the Earth subsurface in vicinity of the first position.

13. The system of claim 11, wherein each optical beam steering unit is a motorized mirror that reflects the corresponding LDV beam emitted from the LDV to the Earth surface in a predetermined angle.

14. The system of claim 11, wherein each drone carries the optical beam steering unit by a gimbal.

15. The system of claim 11, wherein a frequency of the seismic shock waves is less than 100 Hz.

16. The system of claim 11, wherein a bandwidth of the LDV is in a range of tens of kilohertz.

17. The system of claim 11, wherein the underground object includes a metal material or a non-metal material.

18. The system of claim 11, wherein the underground object is a natural source or an artificial object.

19. The system of claim 18, wherein the natural source is oil or gas, and the artificial object is a trench, a trap, or a landmine.

20. The system of claim 11, wherein a weight of each drone of the plurality of drones is less than a weight threshold.

* * * * *